(12) United States Patent
Xiao et al.

(10) Patent No.: US 11,951,992 B2
(45) Date of Patent: Apr. 9, 2024

(54) VEHICLE POSITIONING METHOD AND APPARATUS, STORAGE MEDIUM, AND ELECTRONIC DEVICE

(71) Applicant: Guangzhou Automobile Group Co., Ltd., Guangdong (CN)

(72) Inventors: Hai Xiao, Sunnyvale, CA (US); Jin Shang, Sunnyvale, CA (US)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 692 days.

(21) Appl. No.: 17/142,212

(22) Filed: Jan. 5, 2021

(65) Prior Publication Data
US 2022/0212672 A1    Jul. 7, 2022

(51) Int. Cl.
*B60W 40/06* (2012.01)
*B60W 30/12* (2020.01)
(Continued)

(52) U.S. Cl.
CPC ............ *B60W 40/06* (2013.01); *B60W 30/12* (2013.01); *G06N 3/04* (2013.01); *G06V 20/56* (2022.01);
(Continued)

(58) Field of Classification Search
CPC .. B60W 40/06; B60W 30/12; B60W 2420/42; B60W 2552/30; B60W 2556/40;
(Continued)

(56) References Cited

U.S. PATENT DOCUMENTS

2015/0266422 A1    9/2015  Chundrlik, Jr. et al.
2017/0010618 A1*   1/2017  Shashua ............... B60W 30/18
(Continued)

FOREIGN PATENT DOCUMENTS

| CN | 107643086 B | * | 7/2016 | |
| CN | 109635737 A |   | 4/2019 | |
| CN | 109752741 B | * | 8/2023 | ............ B60W 40/06 |

OTHER PUBLICATIONS

Translation CN-109752741-B (Year: 2023).*
Translation CN-107643086-B (Year: 2016).*

*Primary Examiner* — Frederick M Brushaber
(74) *Attorney, Agent, or Firm* — ScienBiziP, P.C.

(57) ABSTRACT

Disclosed is a vehicle positioning method and apparatus, a storage medium and an electronic device. The method comprises: prelocating a target vehicle in a running state based on a global positioning system to obtain a priori position of the target vehicle in a map; acquiring running image data collected by a camera sensor in the target vehicle in a target area where the priori position is located; visually recognizing the running image data by using a vector map of the target area, so as to acquire lateral position information and longitudinal position information about a position where the target vehicle is located currently; determining a target lane in which a target vehicle is located according to the transverse position information, and positioning a travel position of the target vehicle in the target lane according to the longitudinal position information. The present invention solves the technical problem in the related art that the positioning accuracy of a vehicle is relatively low on the premise that the costs are limited.

7 Claims, 5 Drawing Sheets

(51) Int. Cl.
*G06N 3/04* (2023.01)
*G06V 20/56* (2022.01)

(52) U.S. Cl.
CPC ... *B60W 2420/403* (2013.01); *B60W 2552/30* (2020.02); *B60W 2556/40* (2020.02)

(58) Field of Classification Search
CPC ........ G06N 3/04; G06V 20/56; G06V 20/588; G01C 21/3658; G01C 21/30
See application file for complete search history.

(56) References Cited

U.S. PATENT DOCUMENTS

| | | | | |
|---|---|---|---|---|
| 2018/0024562 | A1* | 1/2018 | Bellaiche | G06T 7/73 701/26 |
| 2019/0375405 | A1* | 12/2019 | Mizoguchi | B60W 10/18 |
| 2020/0116499 | A1* | 4/2020 | Jung | G06V 20/588 |
| 2020/0339156 | A1* | 10/2020 | Tsuchiya | B60W 30/0956 |
| 2021/0309231 | A1* | 10/2021 | Fujita | G01C 21/30 |

* cited by examiner

VEHICLE POSITIONING METHOD AND APPARATUS, STORAGE MEDIUM, AND ELECTRONIC DEVICE

TECHNICAL FIELD

The present invention relates to the field of vehicle control, and in particular, to a vehicle positioning method and apparatus, a storage medium, and an electronic device.

BACKGROUND

Nowadays, smart driving technology is applied to more and more vehicles to assist a driver to more safely and reliably complete a driving process. In order to achieve the above objectives, it is often necessary to accurately position the current position of the vehicle.

At present, positioning the current position of a vehicle is greatly dependent on an expensive vehicle-mounted laser radar (for implementing light detection and distance measurement) and an expensive pre-drawn high-resolution map of a point cloud layer. That is, with the help of on-board lidar and high resolution maps, positioning systems are assisted to achieve vehicle positioning. However, when the foregoing method is used, because the cost of using a vehicle-mounted laser radar and a high-resolution map of a point cloud layer is relatively high, the method cannot be universally applied to more vehicles. In other words, accurate vehicle positioning is still not achieved within a controlled cost for most cost-constrained vehicles.

In view of the above problems, no effective solution has been proposed.

SUMMARY

Embodiments of the present invention provide a vehicle positioning method and apparatus, a storage medium, and an electronic device, so as to at least solve a technical problem in the related art that accuracy of vehicle positioning is relatively low on a premise that costs are limited.

According to one aspect of the embodiments of the present invention, a vehicle positioning method is provided, comprising: prelocating a target vehicle in a running state based on a global positioning system to obtain a priori position of the target vehicle in a map; acquiring running image data collected by a camera sensor in the target vehicle in a target area where the priori position is located; visually recognizing the running image data by using a vector map of the target area, so as to acquire lateral position information and longitudinal position information about a position where the target vehicle is located currently; determining a target lane on which the target vehicle is located according to the transverse position information, and positioning a travel position of the target vehicle in the target lane according to the longitudinal position information.

According to another aspect of the embodiments of the present invention, a vehicle positioning apparatus is further provided, comprising: a prelocating unit, configured to prelocate a target vehicle in a running state based on a global positioning system to obtain a priori position of the target vehicle in a map; an acquisition unit, configured to acquire running image data currently collected by a camera sensor in the target vehicle in a target area where the priori position is located; an identification unit, configured to visually identify the running image data by using a vector map of the target area, so as to acquire lateral position information and longitudinal position information about a position where the target vehicle is located currently; a positioning unit, configured to determine a target lane on which the target vehicle is located according to the transverse position information, and position a travel position of the target vehicle in the target lane according to the longitudinal position information.

According to another aspect of the embodiments of the present invention, a computer readable storage medium is further provided. The computer readable storage medium stores a computer program, wherein the computer program is configured to execute the vehicle positioning method during running.

According to another aspect of the embodiments of the present invention, an electronic device is also provided, comprising a memory and a processor, wherein the memory stores a computer program, and the processor is configured to execute the vehicle positioning method by means of the computer program.

In the embodiment of the present invention, a camera sensor is used to replace an on-board laser radar to obtain travel image data of a target vehicle in a travel state, and combining a vector map of an area where the target vehicle is currently located to obtain lateral position information and longitudinal position information of a position where the target vehicle is currently located, so as to determine a target lane where the target vehicle is currently located and a travel position located in the target lane by using the lateral position information and the longitudinal position information. That is to say, on the premise of saving usage costs, in conjunction with running image data and a vector map collected by a camera sensor, a target lane and a running position where a target vehicle in a running state is located are precisely recognized, so as to achieve the effect of improving the positioning accuracy of the vehicle, thereby overcoming the problem in the related art that the positioning accuracy of the vehicle is relatively low on the premise of being limited in costs.

BRIEF DESCRIPTION OF THE DRAWINGS

Drawings, provided for further understanding of the present invention and forming a part of the description, are used to explain the present invention together with embodiments of the present invention rather than to limit the present invention. In the drawings.

DETAILED DESCRIPTION OF THE EMULSIONS

To make persons skilled in the art better understand the solutions of the present invention, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall belong to the scope of protection of the present invention.

It should be noted that, terms such as "first" and "second" in the description, claims, and the accompanying drawings of the present invention are used to distinguish similar objects, but are not necessarily used to describe a specific sequence or order. It should be understood that the data so used may be interchanged where appropriate so that the embodiments of the invention described herein can be implemented in sequences other than those illustrated or described herein. In addition, the terms "include" and "have", and any variations thereof, are intended to cover a non-exclusive inclusion, for example, a process, method, system, product, or apparatus that includes a series of steps or units is not necessarily limited to those steps or units that are expressly listed, but may include other steps or units that are not expressly listed or inherent to such process, method, product, or apparatus.

Figure 1:
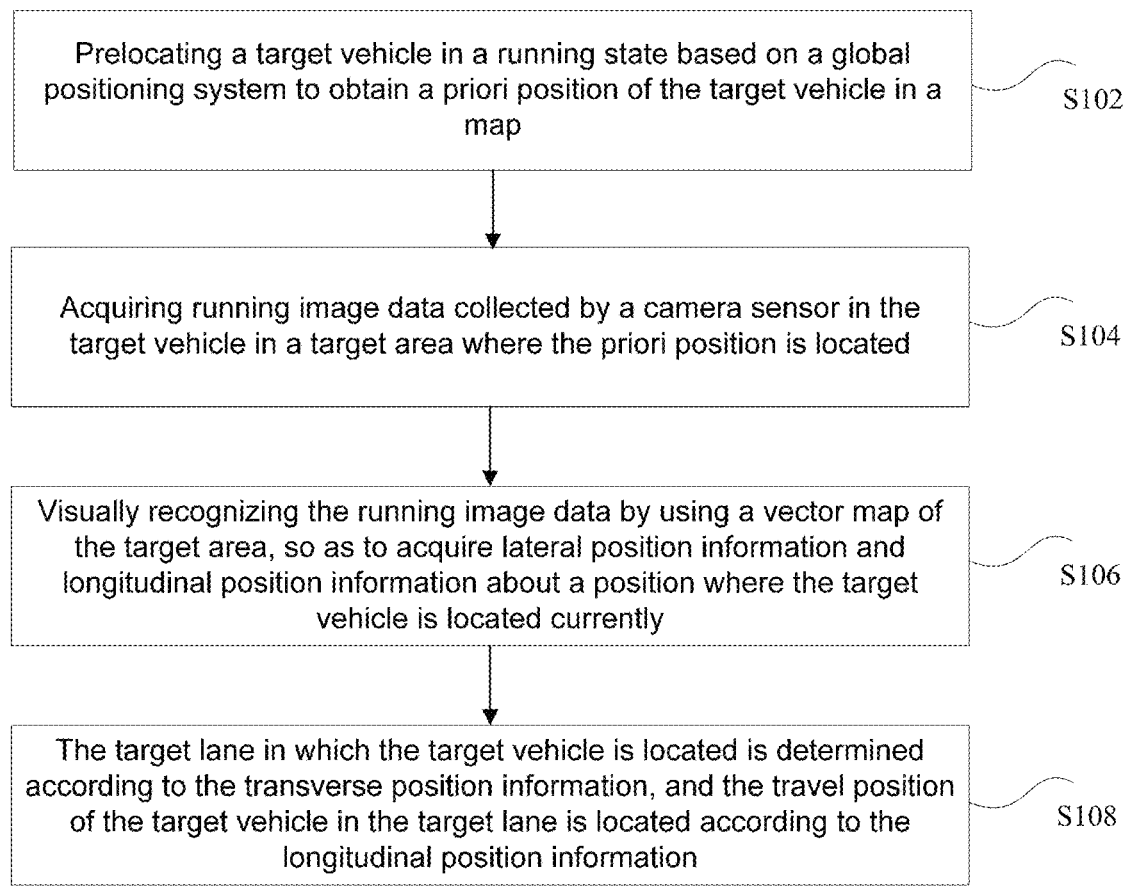
FIG. 1 is a flowchart of an alternative vehicle positioning method according to an embodiment of the present invention.

According to one aspect of the embodiments of the present invention, a vehicle positioning method is provided. Optionally, as an optional implementation, as shown in FIG. 1, the vehicle positioning method includes:

S102, prelocating a target vehicle in a running state based on a global positioning system to obtain a priori position of the target vehicle in a map;

S104, acquiring running image data collected by a camera sensor in the target vehicle in a target area where the priori position is located;

S106, visually recognizing the running image data by using a vector map of the target area, so as to acquire lateral position information and longitudinal position information about a position where the target vehicle is located currently;

S108, the target lane in which the target vehicle is located is determined according to the transverse position information, and the travel position of the target vehicle in the target lane is located according to the longitudinal position information.

Optionally, in this embodiment, the vehicle positioning method may be applied to, but is not limited to, a vehicle configured with an Advanced Driver Assistance System (ADAS), so as to assist the vehicle to implement accurate positioning in real time during automatic driving. The ADAS system uses various sensors installed on a vehicle to sense the surrounding environment at any time during the running process of the vehicle, collects data, performs recognition, detection and tracking of static and dynamic objects, collects map data of a navigator, and performs calculation and analysis of the system, so that a driver is aware in advance of a danger that may occur, thereby effectively increasing the comfort and safety of vehicle driving. The sensor may be, but is not limited to, a camera sensor with a low usage cost, and the map data may be, but is not limited to, a vector map. Here, both size information and direction information are recorded in the vector map. The foregoing is an example, which is not limited in this embodiment.

In the present embodiment, the travel image data of the target vehicle in the travel state is acquired by using the camera sensor instead of the on-vehicle laser radar, and combining a vector map of an area where the target vehicle is currently located to obtain lateral position information and longitudinal position information of a position where the target vehicle is currently located, so as to determine a target lane where the target vehicle is currently located and a travel position located in the target lane by using the lateral position information and the longitudinal position information. That is to say, on the premise of saving usage costs, in conjunction with running image data and a vector map collected by a camera sensor, a target lane and a running position where a target vehicle in a running state is located are precisely recognized, so as to achieve the effect of improving the positioning accuracy of the vehicle, thereby overcoming the problem in the related art that the positioning accuracy of the vehicle is relatively low on the premise of being limited in costs.

Alternatively, in this embodiment, the global positioning system may include: a Global Navigation Satellite System (GNSS), and the vector image may be acquire by the following components: an Inertial measurement unit (IMU), and an odometer. Among them, the GNSS, is a space-based radio navigation system that can provide all-weather three-dimensional coordinates and speed as well as time information to a user at any location on the surface of the earth or in a nearby space. An IMU, which is generally composed of a gyroscope, an accelerometer and an algorithm processing unit, obtains a movement track of a body by measuring acceleration and a rotation angle.

In addition, in this embodiment, in the process of using the vector map of the area where the target vehicle is currently located to visually recognize the running image data, so as to acquire the transverse position information and the longitudinal position information of the position where the target vehicle is currently located, the method may include, but is not limited to, using a visual recognition technology and depth learning implemented by a deep neural network.

The visual recognition technology in this embodiment is a machine vision technology, mainly using a computer to simulate a human visual function, extracting information from an image of an objective and processing same, and understanding same, and finally being used for actual detection, measurement and control.

Here, the deep neural network in the present embodiment is a human brain idea simulation mode, and lane information of each lane in a traveling road on which the deep neural network is located is identified from traveling image data of a target vehicle in combination with a vector map. The lane information herein may include but is not limited to: the lane marked by each lane, the lane identifier of the target lane where the target vehicle is currently located, and the offset distance of the target vehicle relative to the lane center of the target lane; in addition, a heading angle of the target vehicle and an error between the heading angle and a tangent of the target lane are also included. The content of the foregoing lane information is an example, and this embodiment can further include other information, which is not limited herein.

According to the embodiment provided by the present disclosure, the running image data of the target vehicle in the running state is acquired using a camera sensor in place of the on-board laser radar, in conjunction with a vector map of a region where a target vehicle is located currently, acquiring lateral position information and longitudinal position information about the position where the target vehicle is located currently, in this way, the transverse position information and the longitudinal position information are used, and the travel image data and the vector map collected by the camera sensor are combined to accurately identify and locate the target lane and the travel position of the target vehicle in the travelling state, thereby achieving the effect of improving the positioning accuracy of the vehicle. Thus, the problem in the related art that the positioning accuracy of the vehicle is relatively low on the premise that the cost is limited is overcome.

As an optional solution, the step of visually recognizing the running image data by using a vector map of the target area, so as to acquire lateral position information and longitudinal position information about a position where the target vehicle is located currently comprises:

S1, performing visual recognition on the running image data by means of a visual recognition technique, so as to obtain a recognition result;

S2, matching the vector map and the recognition result, so as to determine road information about a region where a target vehicle is located currently in the travel image data, wherein the road information comprises a road network and a fixed road object located beside the road;

S3, acquiring lateral position information and longitudinal position information about the current position of the target vehicle according to the road information.

Optionally, in this embodiment, the road network may include but is not limited to road networking formed by various lanes in different directions in one area. The above fixed road object may include, but is not limited to, traffic lights, traffic signs, utility poles, and the like. The foregoing is an example, which is not limited in this embodiment.

Figure 2:
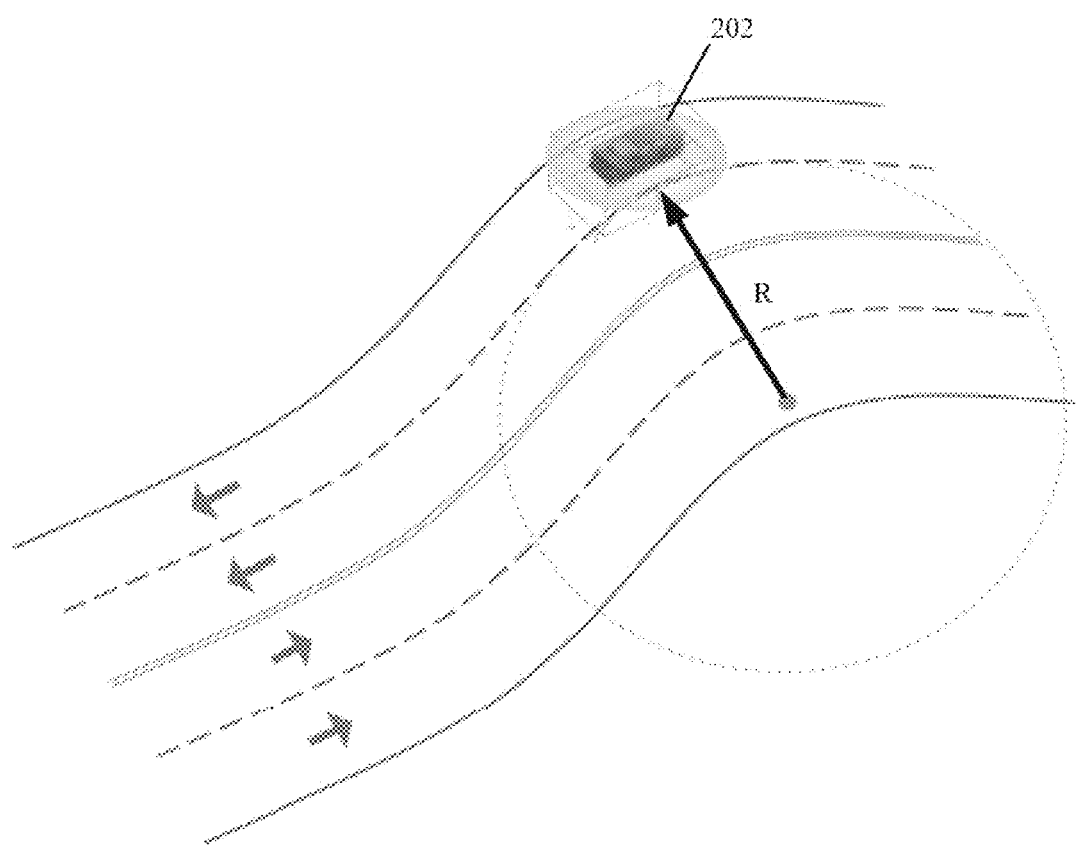
FIG. 2 is a schematic diagram of an application environment of an optional vehicle positioning method according to an embodiment of the present invention.

Specifically, with reference to the scenario shown in FIG. 2, it is assumed that a recognition result is obtained after visual recognition is performed on running image data collected by a camera sensor by using a visual recognition technology, and after the recognition result is compared with information in an ADAS vector map, road information, such as a road network and a fixed road object (for example, a traffic light and a sign), in an area where a target vehicle 202 is located is obtained. Further, the lateral position information and the longitudinal position information of the position where the target vehicle 202 is currently located will be determined using the road information described above.

Therein, in a precise vector map, like OpenDrive, various critical geometry information (e.g. current lane turn radius, current lane identification, etc.) related to the road link can be intuitively obtained by retrieving or scaling from a given reference point on the map. For example, as shown in FIG. 2, an oval 2D Gaussian distribution combines a traditional global positioning system for inertial measurement unit and odometer measurement, which is proved in a Gaussian kernel size in the figure. Accordingly, based on the above-described integration information, it is possible to recognize that the width of the lane is greater than 3.5 m through analysis and estimation. In addition, it can also be determined that the target lane where the target vehicle 202 is currently located is an outermost lane (i.e. lateral position information) as shown in FIG. 2, and the driving position is a curve (i.e. longitudinal position information) as shown in FIG. 2.

By means of the embodiments provided in the present application, lateral position information and longitudinal position information about a position where a target vehicle is located are precisely located by combining a visual recognition result and a vector map, so as to achieve the effect of ensuring the improvement of positioning accuracy on the premise of saving usage costs.

As an optional solution, the step of acquiring, according to road information, lateral position information about a current position where a target vehicle is located comprises:

S1, detecting and identifying road information by means of a deep neural network, so as to obtain lane information about all lanes on a road where a target vehicle is currently traveling, wherein the lane information comprises: lane lines marked for various lanes, a lane identifier of a target lane where the target vehicle is currently located, and an offset distance of the target vehicle with respect to a lane centre of the target lane at present;

S2, generating lateral position information according to the lane identifier and the offset distance of the target lane.

Optionally, in this embodiment, after the obtaining the lane information of all the lanes on the road where the target vehicle is currently traveling, the method further includes: using an independent encoding channel or bit mask to differentially mark each lane on the road where the target vehicle is currently traveling in different marking manners.

It should be noted that, the deep neural network herein is obtained through training by using a plurality of pieces of sample data, and is used to detect lane lines of a plurality of lanes in the road information after recognition and comparison. The network structure of the deep neural network herein may include, but is not limited to, a convolution layer, a pooling layer, and a fully-connected layer, wherein each weight parameter in the described network structure may be obtained through multiple times of iteration training. Details are not described herein again.

In addition, in this embodiment, a lane line of a plurality of lanes (for example, a straight lane or a curve lane) within the field of view of the camera is acquired by detecting and identifying the road information. Here, the lane line may be marked in different manners, but is not limited thereto.

Figure 3:
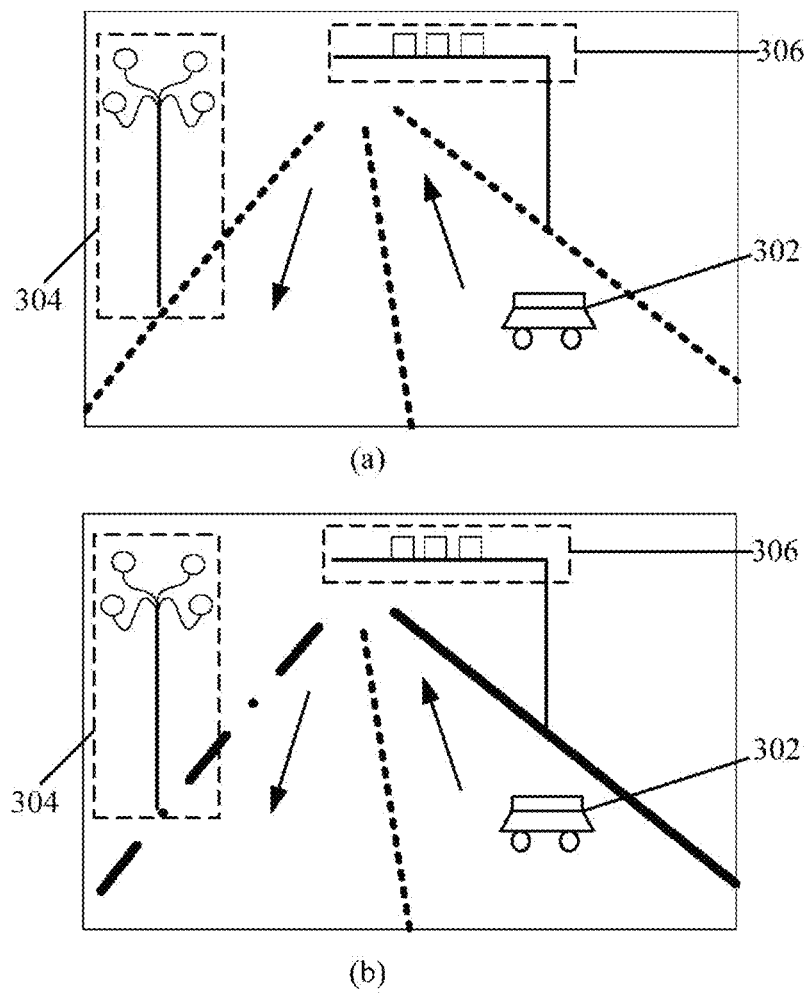
FIG. 3 is a schematic diagram of an optional vehicle positioning method according to an embodiment of the present invention.

For example, it is assumed that the lane information of all the lanes in the driving road where the target vehicle 302 is located may be as shown in FIG. 3: as shown in FIG. 3(a), each lane line may be displayed by a dot, and as shown in FIG. 3(b), different lane lines may also be identified by using different line types. In addition, different lane lines (not shown in the figures) may also be marked using different colors. To this end, in this embodiment, additional encoding channels or individual bitmasks (consistent with the captured image dimensions) may be used, without limitation, to implement a time-consuming pattern extraction process that eliminates associated with each individual lane line, e.g., without having to swipe the window again to identify individual pixels in the image.

In addition, as shown in FIG. 3, the recognized lane information may further include a street light 304, a traffic light 306, and the like. FIG. 3 shows an example, which is not limited in this embodiment.

The specific description is given with reference to the following examples:

after the road information obtained by matching the recognition result obtained by performing visual recognition on the running image data with the vector map is acquired, the road information may be detected and recognized through the deep neural network, so as to obtain the lane information of each lane. And fitting a curve of each lane line by means of an algorithm module in a vehicle-mounted processor on a vehicle, and then generating a lane parameter fitted to each curve according to a fitting mode (polyfit^2, polyfit^3 or spline, etc.), in which the lane parameter herein may comprise, but is not limited to, a lane identifier and an offset distance from a lane centre.

Further, the lane identifier of the target lane where the target vehicle is currently located and the offset distance of the target vehicle from the center of the lane of the target lane are determined from all the lanes by the vision recognition technology. For example, it is assumed that the target lane in which the target vehicle is recognized is an exit or an inner lane or an outer lane; further, it is located inside the lane: the target vehicle is located at a position shifted by 10 cm from the center of the lane in the target lane.

Through the embodiments provided by the present application, a deep neural network is used to detect and identify a road, so as to obtain lane information of each lane, and further to identify and obtain lateral position information of a target lane where the target vehicle is located. For example, the lane identifier of the target lane and the offset distance of the target vehicle with respect to the lane center of the target lane can be positioned laterally accurately, and the accuracy can reach the centimeter level.

As an alternative solution, acquiring longitudinal position information about the current position of the target vehicle according to the road information comprises:
- S1, when lateral position information is acquired, acquiring, according to road information, a lane parameter of a fitted lane corresponding to the target lane where a target vehicle is located, wherein the lane parameter comprises a target lane radius;
- S2, reading a reference lane radius of a target lane from a vector map;
- S3, comparing the target lane radius with a reference lane radius;
- S4, determining the travel position of the target vehicle in the target lane according to the comparison result, so as to obtain the longitudinal position information of the target vehicle.

The description is specifically made in conjunction with the following examples: in the case where a target lane where a target vehicle is located is determined, a fitting parameter for fitting a lane can be acquired, in which the lane parameter for fitting a lane herein may comprise but is not limited to: a fitting coefficient, an offset distance from a lane centre, an error degree between a heading angle of the target vehicle and a lane tangential direction, and a turning radius of a position where the target vehicle is currently located.

Figure 4:
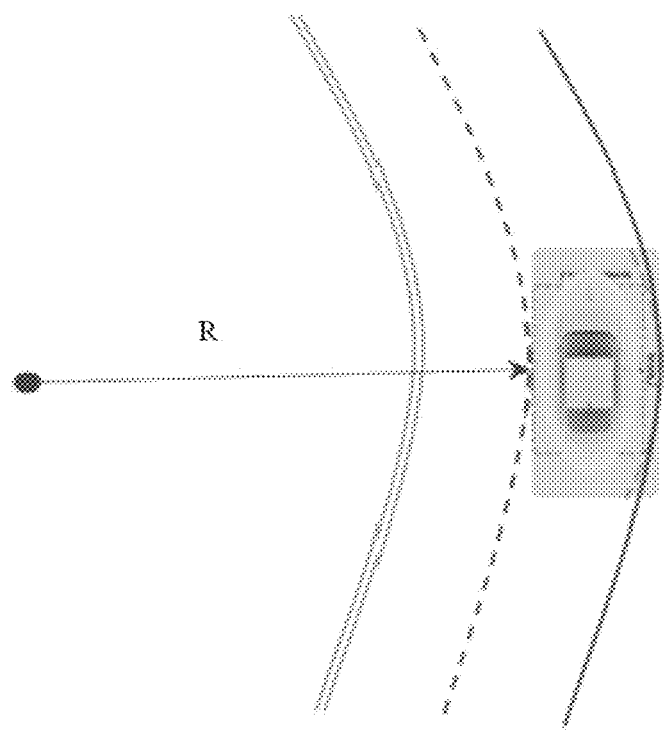
FIG. 4 is a schematic diagram of another alternative vehicle positioning method according to an embodiment of the present invention.

It is assumed that the lateral positioning result of the target vehicle is as shown in FIG. 4, the target vehicle is located in the right outer lane, and the lane radius here is a radius R (the positioning accuracy thereof is on the order of cm). This is reflected on the narrow border of the transverse Gaussian distribution of FIG. 4 (the ellipse in which the target vehicle is located).

Further, reference lane radiuses r1, r2 . . . rn that are recorded by the target vehicle at a plurality of consecutive positions in the longitudinal direction of the target lane based on the current position are acquired from the vector map. By sequentially comparing the radius R with the reference lane radii $r_1, r_2 \ldots r_n$, the nearest matching mechanism in the longitudinal direction is used to precisely position the longitudinal positioning of the target vehicle in the target lane at present, i.e. the longitudinal position corresponding to $r_i$ closest to the lane radius R is determined as the travel position of the target vehicle.

By means of the embodiments provided in the present application, a driving position corresponding to the target vehicle in a target lane is determined by comparing lane radiuses, so that the target vehicle is accurately positioned longitudinally.

As an optional solution, the determining a driving position of a target vehicle in a target lane according to a comparison result to obtain longitudinal position information of the target vehicle comprises:
- S1, determining a longitudinal driving area of a target vehicle in a target lane according to a comparison result;
- S2, the driving position is determined from the longitudinal driving range.

Alternatively, in the embodiment, the act of determining the driving position from the longitudinal driving area may include at least one of the following acts:
1. in the case where the curvature of a lane of a target lane is not constant, using a maximum likelihood method on the following data so as to determine a driving position from a longitudinal driving area: a real curvature of the target lane, a reference curvature estimated for the target lane via a positioning system, and a sampling curvature estimated by a target vehicle based on sampling points associated with a current position;
2. in the case where a map road sign is included in a longitudinal driving area, estimating a driving position according to a target road sign closest to a current position where a target vehicle is located;
3. in the case where the curvature of a lane of a target lane is constant and a map road sign is not included in a longitudinal driving area, using positioning mark data stored in a positioning system to estimate a driving position;
4. the running position is estimated from the longitudinal running region using the carrier phase finding technique.

Figure 5:
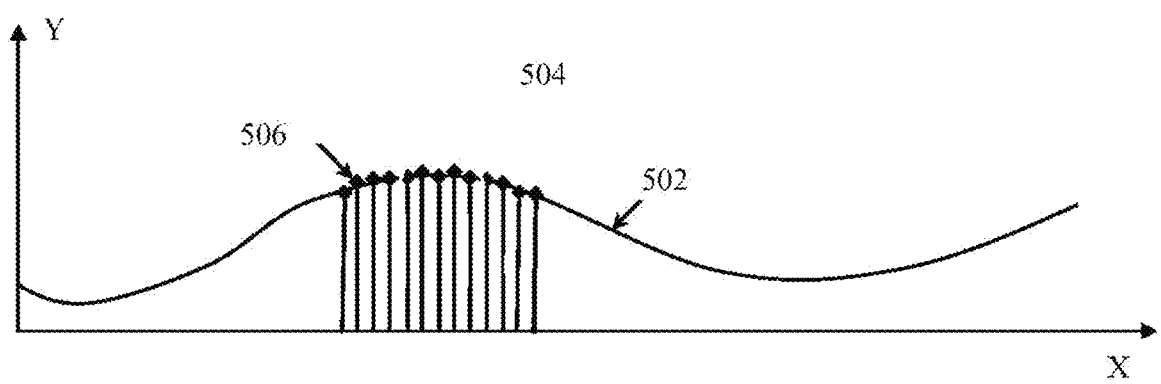
FIG. 5 is a schematic diagram of a further alternative vehicle positioning method according to an embodiment of the present invention.

It should be noted that, in the foregoing embodiment, a processing cost is higher than a processing cost of a lane radius manner in sequence, so that a longitudinal travel area in which a target vehicle is located may be determined first by using the foregoing manner, and further, a travel position of the target vehicle in the longitudinal direction is estimated from the longitudinal travel area by using any one of the following manners:

1) In a road section with a non-constant (irregular) curvature, a maximum likelihood method can be used to solve a longitudinal positioning problem. As shown in FIG. 5, a curve 502 is an actual road with a real curvature marked on a map; the curve 504 of the Gaussian distribution is an estimation of the longitudinal position from the fusion of the global navigation satellite system, the inertial measurement unit, and the odometer, and it can be seen from the figure that there is a certain deviation between the two, for example, about 10.0 meters. The diamond point in curve 506 is the curvature estimated from a set of sampling points around the current position of the target vehicle. With the curves 502 through 506 described above, the maximum likelihood method can be used to estimate a precise positioning of longitudinal positioning within 1~2 meters.

2) In a road section marked with a map road sign, using a visual recognition technology to recognize a road sign (e.g. a utility pole) closest to a position where a target vehicle is located; these recognition results are then used to update their longitudinal estimates. According to the visual performance, the camera viewing angle, the processing speed and the map precision, the accurate positioning of the longitudinal positioning within 2~3 meters is realized.

3) Co-localization was conducted in conjunction with the above-described Embodiments 1)-2).

4) On a road section (for example, a straight line or a circle) with a constant curvature, the longitudinal positioning may be directly performed by using the foregoing manner 2.

5) Other visual cues can be acquired on a road section where the curvature is unchanged and there is no obvious road sign, so as to improve the positioning of a global navigation satellite system, an inertial measurement unit, an odometer, etc. For example, city/horizon sketches may be used instead, as long as it is represented in some way on the map.

6) Use Global Navigation Satellite System, Inertial Measuring Unit, Odometer only when none of the above tools are available. In addition, a Real time kinematic (Real time kinematic, RTK for short) technology is parallel to all the described mechanisms, and here, other radio-based positioning enhancement (such as a V2X mechanism) can also be used to realize the positioning of the target vehicle itself.

By means of the embodiments provided in the present application, by combining different methods, further precise longitudinal positioning is implemented on a longitudinal driving region, so as to obtain a driving position of a target vehicle in a target lane, thereby ensuring the precision of vehicle positioning.

It should be noted that, for brevity of description, the foregoing method embodiments are described as a series of action combinations. However, persons skilled in the art should understand that the present invention is not limited by the described action sequence, because according to the present invention, some steps may be performed in another sequence or simultaneously. Secondly, those skilled in the art should also know that the embodiments described in the description are all preferred embodiments, and the involved actions and modules are not necessarily required in the present invention.

Figure 6:
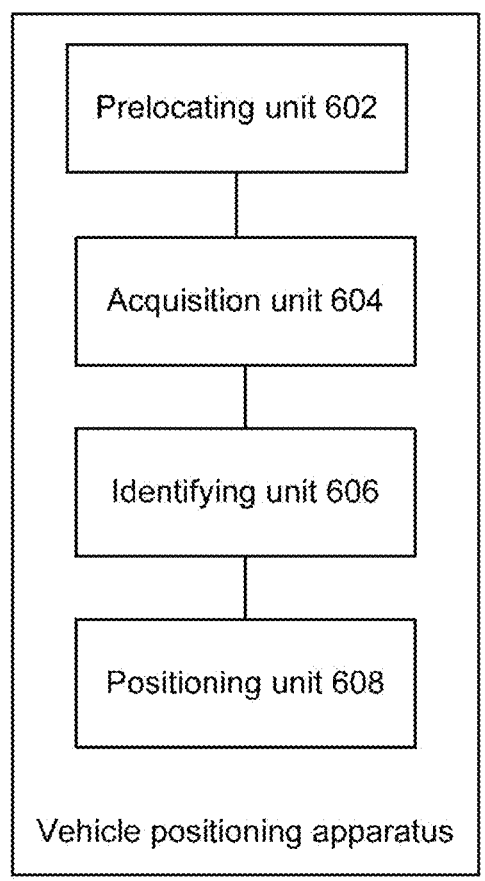
FIG. 6 is a schematic structural diagram of an optional vehicle positioning apparatus according to an embodiment of the present invention.

According to another aspect of the embodiments of the present invention, a vehicle positioning apparatus for implementing the vehicle positioning method is further provided. As shown in FIG. 6, the device includes:

1) a prelocating unit 602, configured to prelocate a target vehicle in a running state based on a global positioning system to obtain a priori position of the target vehicle in a map;
2) an acquisition unit 604, configured to acquire running image data currently collected by a camera sensor in the target vehicle in a target area where the priori position is located;
3) an identifying unit 606, configured to visually identify the running image data by using a vector map of the target area, so as to acquire lateral position information and longitudinal position information about a position where the target vehicle is located currently;
4) a positioning unit 608, configured to determine a target lane on which a target vehicle is located according to the transverse position information, and position a driving position of the target vehicle in the target lane according to the longitudinal position information.

Alternatively, for a specific embodiment of a vehicle positioning apparatus provided in an embodiment of the present application, reference may be made to the foregoing method embodiments, and details are not described herein again.

As an optional solution, the identifying unit includes:
1) an identification module, configured to perform visual recognition on running image data by means of a visual recognition technique to obtain a recognition result;
2) a matching module, configured to match a vector map and a recognition result, so as to determine road information in a region where a target vehicle is located currently in running image data, wherein the road information comprises a road network and a fixed road object located beside a road;
3) an acquisition module, configured to acquire lateral position information and longitudinal position information about the current position of the target vehicle according to the road information.

Alternatively, for a specific embodiment of a vehicle positioning apparatus provided in an embodiment of the present application, reference may be made to the foregoing method embodiments, and details are not described herein again.

According to an aspect of the present application, there is provided a computer program product or a computer program, wherein the computer program product or the computer program comprises computer instructions, and the computer instructions are stored in a computer-readable storage medium. A processor of a computer device reads the computer instruction from a computer-readable storage medium, and the processor executes the computer instruction, so that the computer device executes the described vehicle positioning method, wherein the computer program is set to execute the steps in any one of the described method embodiments at runtime.

Alternatively, in this embodiment, the computer readable storage medium may be arranged to store a computer program for executing the following steps:

S1, prelocating a target vehicle in a running state based on a global positioning system to obtain a priori position of the target vehicle in a map;
S2, acquiring running image data collected by a camera sensor in the target vehicle in a target area where the priori position is located;
S3, visually recognizing the running image data by using a vector map of the target area, so as to acquire lateral position information and longitudinal position information about a position where the target vehicle is located currently;
S4, determining a target lane in which the target vehicle is located according to the transverse position information, and positioning a travel position of the target vehicle in the target lane according to the longitudinal position information.

Optionally, in this embodiment, a person of ordinary skill in the art may understand that all or a part of the steps of the methods in the foregoing embodiments may be implemented by a program instructing relevant hardware of a terminal device. The program may be stored in a computer readable storage medium, and the storage medium may include a flash memory disk, a Read-Only Memory (ROM), a Random Access Memory (RAM), a magnetic disk, or an optical disk.

The sequence numbers of the embodiments of the present invention are only for description, and do not represent the preference of the embodiments.

If the integrated unit in the foregoing embodiment is implemented in a form of a software functional unit and sold or used as an independent product, the integrated unit may be stored in the foregoing computer-readable storage medium. Based on such understanding, the technical solutions of the present invention essentially or in part contributing to the prior art or all or part of the technical solutions may be embodied in the form of a software product. The computer software product is stored in a storage medium, and includes several instructions for enabling one or more computer devices (which may be personal computers, servers or network devices, etc.) to perform all or part of the steps of the method described in each embodiment of the present invention.

In the foregoing embodiments of the present invention, descriptions of the embodiments are focused on each other, and for a part that is not described in detail in a certain embodiment, reference may be made to related descriptions of other embodiments.

In the several embodiments provided in the present application, it should be understood that the disclosed client may be implemented in other manners. The apparatus embodiments described above are merely exemplary. For example, division of the units is merely logical function division, and may be other division in actual implementation. For example, a plurality of units or components may be combined or integrated into another system, or some features may be ignored or not executed. In addition, the displayed or discussed mutual couplings or direct couplings or communication connections may be implemented through some interfaces. The indirect couplings or communication connections between units or modules may be implemented in electronic or other forms.

The units described as separate parts may or may not be physically separate, and parts displayed as units may or may not be physical units, may be located in one position, or may be distributed on a plurality of network elements. A part or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, and may also be implemented in a form of a software functional unit.

The above are only preferred embodiments of the present invention. It should be noted that, a person of ordinary skill in the art may make further improvements and modifications without departing from the principle of the present invention, and these improvements and modifications shall also belong to the scope of protection of the present invention.

What is claimed is:

1. A vehicle positioning method operated in a vehicle, the vehicle comprising a global positioning system and a camera sensor, the method comprising:
   obtaining a priori position of the vehicle in a map based on the global positioning system when the vehicle is in a running state;
   obtaining running image data collected by the camera sensor of the vehicle in a target area where the priori position is located;
   recognizing the running image data by using a vector map of the target area, so as to acquire lateral position information and longitudinal position information about a position where the vehicle is located currently;
   determining a target lane on which the vehicle is located according to the transverse position information, and positioning a driving position of the vehicle in the target lane according to the longitudinal position information; and
   performing an assisted driving action according to the target lane on which the vehicle is locate and the driving position of the vehicle in the target lane;
   wherein recognizing the running image data by using a vector map of the target area, so as to acquire lateral position information and longitudinal position information about a position where the vehicle is located currently comprises:
   performing visual recognition on the running image data by using a visual recognition technique so as to obtain a recognition result;
   matching the vector map and the recognition result, so as to determine road information about a region in the running image data where the vehicle is located currently, wherein the road information comprises a road network and a fixed road object located beside a road; and
   acquiring the lateral position information and the longitudinal position information about the current position of the vehicle according to the road information;
   wherein acquiring the longitudinal position information about the current position of the vehicle according to the road information comprises:
   acquiring, according to the road information, a roadway parameter of a fitted lane corresponding to the target lane where the vehicle is located, wherein the roadway parameter comprises a target lane radius;
   reading a reference lane radius of the target lane from the vector map;
   comparing the target lane radius to the reference lane radius; and
   determining the driving position of the vehicle in the target lane according to the comparison result, so as to obtain the longitudinal position information of the vehicle.

2. The method according to claim 1, wherein acquiring the lateral position information about the current position of the vehicle according to the road information comprises:
   detecting and identifying the road information by using a deep neural network, so as to obtain the lane information about all the lanes on the road where the vehicle is currently traveling, wherein the lane information comprises: lane lines marked for various lanes, a lane identifier of the target lane where the vehicle is currently located, and an offset distance of the vehicle with respect to a lane center of the target lane at present; and
   generating the lateral position information according to the lane identifier of the target lane and the offset distance.

3. The method according to claim 2, wherein after obtaining the lane information of all the lanes on the road where the vehicle is currently traveling, the method further comprises:
   using independent encoding channels or bit masks to differentially mark each lane on the road where the vehicle is currently traveling in different marking manners.

4. The method according to claim 1, wherein determining the driving position of the vehicle in the target lane according to the comparison result, so as to obtain the longitudinal position information of the vehicle comprises:
   determining a longitudinal driving area of the vehicle in the target lane according to a result of the comparison; and
   determining the driving position from the longitudinal driving area.

5. The method according to claim 4, wherein determining the driving position from the longitudinal driving area comprises at least one of the following:
   when the curvature of the lane of the target lane is not constant, using a maximum likelihood method on the following data to determine the driving position from the longitudinal driving area: a real curvature of the target lane, a reference curvature estimated for the target lane by a positioning system, and a sampling curvature estimated by the vehicle based on sampling points associated with a current position;

when a map road sign is included in the longitudinal driving area, estimating the driving position according to a target road sign closest to the current position where the vehicle is located;

estimating the driving position using location marker data already stored in a positioning system if a curvature of a lane of the target lane is constant and a map road sign is not included in the longitudinal driving area; and estimating the driving position from the longitudinal driving region using a carrier phase finding technique.

6. A vehicle positioning apparatus comprising:

a global positioning system;

a camera sensor;

at least one processor coupled to the global positioning system and the camera sensor; and a data storage storing one or more programs which when executed by the at least one processor, cause the at least one processor to obtain a priori position of the vehicle in a map based on the global positioning system when the vehicle is in a running state;

obtaining running image data currently collected by the camera sensor of the vehicle in a target area where the priori position is located;

recognize the running image data by using a vector map of the target area, so as to acquire lateral position information and longitudinal position information about a position where the vehicle is located currently;

determine a target lane in which the vehicle is located according to the transverse position information, and position a driving position of the vehicle in the target lane according to the longitudinal position information; and performing an assisted driving action according to the target lane on which the vehicle is locate and the driving position of the vehicle in the target lane;

wherein the at least one processor recognizing the running image data by using a vector map of the target area, so as to acquire lateral position information and longitudinal position information about a position where the vehicle is located currently comprises:

performing visual recognition on the running image data by using a visual recognition technique so as to obtain a recognition result;

matching the vector map and the recognition result, so as to determine road information about a region in the running image data where the vehicle is located currently, wherein the road information comprises a road network and a fixed road object located beside a road; and acquiring the lateral position information and the longitudinal position information about the current position of the vehicle according to the road information;

wherein the at least one processor acquiring the longitudinal position information about the current position of the vehicle according to the road information comprises:

acquiring, according to the road information, a roadway parameter of a fitted lane corresponding to the target lane where the vehicle is located, wherein the roadway parameter comprises a target lane radius;

reading a reference lane radius of the target lane from the vector map;

comparing the target lane radius to the reference lane radius; and determining the driving position of the vehicle in the target lane according to the comparison result, so as to obtain the longitudinal position information of the vehicle.

7. A computer readable non-transitory storage medium having stored thereon instructions that, when executed by a processor of a vehicle, causes the vehicle to perform a vehicle positioning method, the vehicle positioning method comprising:

obtaining a priori position of the vehicle in a map based on a global positioning system of the vehicle when the vehicle is in a running state;

obtaining running image data collected by a camera sensor of the vehicle in a target area where the priori position is located;

recognizing the running image data by using a vector map of the target area, so as to acquire lateral position information and longitudinal position information about a position where the vehicle is located currently;

determining a target lane on which the vehicle is located according to the transverse position information, and positioning a driving position of the vehicle in the target lane according to the longitudinal position information; and performing an assisted driving action according to the target lane on which the vehicle is locate and the driving position of the vehicle in the target lane;

wherein recognizing the running image data by using a vector map of the target area, so as to acquire lateral position information and longitudinal position information about a position where the vehicle is located currently comprises:

performing visual recognition on the running image data by using a visual recognition technique so as to obtain a recognition result;

matching the vector map and the recognition result, so as to determine road information about a region in the running image data where the vehicle is located currently, wherein the road information comprises a road network and a fixed road object located beside a road; and acquiring the lateral position information and the longitudinal position information about the current position of the vehicle according to the road information;

wherein acquiring the longitudinal position information about the current position of the vehicle according to the road information comprises:

acquiring, according to the road information, a roadway parameter of a fitted lane corresponding to the target lane where the vehicle is located, wherein the roadway parameter comprises a target lane radius;

reading a reference lane radius of the target lane from the vector map;

comparing the target lane radius to the reference lane radius; and determining the driving position of the vehicle in the target lane according to the comparison result, so as to obtain the longitudinal position information of the vehicle.

* * * * *